US011390226B2

United States Patent
Hoshing et al.

(10) Patent No.: US 11,390,226 B2
(45) Date of Patent: Jul. 19, 2022

(54) VEHICLE FLOOR SILENCER WITH WALL SUPPORT ELEMENT

(71) Applicant: Toyota Motor Engineering & Manufacturing North America, Inc., Plano, TX (US)

(72) Inventors: Abhijeet Anil Hoshing, Ann Arbor, MI (US); Taylor E. Darling, Ypsilanti, MI (US); Jonathan Quijano, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 129 days.

(21) Appl. No.: 16/932,062

(22) Filed: Jul. 17, 2020

(65) Prior Publication Data

US 2022/0017022 A1 Jan. 20, 2022

(51) Int. Cl.
*B60R 13/08* (2006.01)
*A47G 27/02* (2006.01)

(52) U.S. Cl.
CPC .......... *B60R 13/083* (2013.01); *A47G 27/02* (2013.01); *A47G 27/0206* (2013.01); *A47G 27/0212* (2013.01); *A47G 27/0268* (2013.01)

(58) Field of Classification Search
CPC ... B60R 13/08; B60R 13/083; B60R 13/0846; B60R 16/0215; H02G 3/00; B60N 3/048; B60Y 2306/09; B29L 2031/3017; B32B 2604/003; B32B 2471/00; A47G 27/00; A47G 27/02; A47G 27/0206; A47G 27/0212; A47G 27/0243; A47G 27/0268; B60H 1/246

(Continued)

(56) References Cited

U.S. PATENT DOCUMENTS 3,078,116 A * 2/1963 West .................. B62D 25/2036
296/208
3,630,564 A * 12/1971 Ferrara .................. H02G 3/045
296/208

(Continued)

FOREIGN PATENT DOCUMENTS

DE 102016102112 A1 * 8/2016 ............. B60R 22/24
JP H0529848 A 4/1993

(Continued)

OTHER PUBLICATIONS

Noriyasu et al., "Vehicular Cushioning Material and Vehicular Interior Material", Published Feb. 7, 2013 by Japanese Patent Office, Edition: JP2013028246A (Year: 2013).*

(Continued)

*Primary Examiner* — Dennis H Pedder
*Assistant Examiner* — Joyce Eileen Hill
(74) *Attorney, Agent, or Firm* — Christopher G. Darrow; Darrow Mustafa PC

(57) ABSTRACT

A vehicle floor silencer includes a base portion and a flange formed along an edge of the base portion. The flange includes a step, a wall extending from the step, and at least one wall support element extending from the wall to the step and structured to prevent at least an associated portion of the wall from deflecting in a direction toward an end of the step. The wall support is structured to prevent deflection of the wall along an edge of the floor silencer.

12 Claims, 2 Drawing Sheets

(58) Field of Classification Search
USPC .......................... 296/39.3, 39.1, 97.23, 208
See application file for complete search history.

(56) References Cited

U.S. PATENT DOCUMENTS

| | | | |
|---|---|---|---|
| 8,727,417 | B2 | 5/2014 | Eguchi et al. |
| 9,919,661 | B2 * | 3/2018 | Iwamoto ............. B60R 13/0243 |
| 10,486,620 | B2 | 11/2019 | Schaefer |
| 10,525,905 | B2 | 1/2020 | Iwata et al. |
| 2013/0029550 | A1 * | 1/2013 | Seth ........................ D06N 3/125 442/76 |
| 2017/0008462 | A1 * | 1/2017 | Taniguchi ............ G10K 11/168 |
| 2018/0127033 | A1 | 5/2018 | Kato |

FOREIGN PATENT DOCUMENTS

| | | | | |
|---|---|---|---|---|
| JP | H0995169 | A | | 4/1997 |
| JP | 2001047923 | A | | 2/2001 |
| JP | 2010100221 | A | * | 5/2010 ............... B60N 3/04 |
| JP | 2013028246 | A | * | 2/2013 ............. B60R 13/02 |
| JP | 5870829 | A | | 10/2013 |
| JP | 2017178229 | A | | 10/2017 |
| JP | 2018039321 | A | | 3/2018 |

OTHER PUBLICATIONS

Tatsukazu, "Interior Component Structure", Published Aug. 11, 2016 by the German Patent Office, Edition: DE102016102112A1 (Year: 2016).*

Keisuke, "Carpet", Published May 6, 2010 by the Japanese Patent Office, Edition: JP2010100221A (Year: 2010).*

Robert Eller Associates, Inc., prospectus titled, "Automotive Interior Soft Trim: Skins, Foams, Coated Fabrics, Textiles, and Acoustic Barriers", found at: http://robertellerassoc.com/prospectus%201002.pdf (Oct. 2002).

* cited by examiner

VEHICLE FLOOR SILENCER WITH WALL SUPPORT ELEMENT

TECHNICAL FIELD

The present invention relates to vehicle interiors and, more particularly, to a vehicle interior floor silencer including a structure for preventing unwanted deflection or deformation of a portion of the floor silencer while supporting interior carpeting.

BACKGROUND

A floor silencer may be installed in a vehicle between a floor of the vehicle interior and interior carpeting. The floor silencer may help attenuate road noise and vibration transmitted through the floor during vehicle operation. The floor silencer also aids in supporting the carpeting especially where the carpeting contacts portions of the vehicle interior trim. However, edge portions of the floor silencer may deflect, causing the carpeting to sag and separate from portions of the trim adjacent the carpeting. This may create gaps through which road noise can penetrate, as well as being aesthetically undesirable for purposes of interior fit and finish.

SUMMARY

In one aspect of the embodiments described herein, a vehicle floor silencer is provided for attenuating noise and vibration in a vehicle occupant compartment during vehicle use. The floor silencer may include a base portion and a flange formed along an edge of the base portion. The flange includes a step, a wall extending from the step, and at least one wall support element extending from the wall to the step and structured to prevent at least an associated portion of the wall from deflecting in a direction toward an end of the step.

DETAILED DESCRIPTION

Described herein are embodiments of a vehicle floor silencer including a base portion and a flange formed along an edge of the base portion. The flange includes a step, a wall extending from the step, and at least one wall support element extending from the wall to the step and structured to prevent at least an associated portion of the wall from deflecting in a direction toward an end of the step. The wall support is structured to prevent deflection of the wall along an edge of the floor silencer. This may prevent interior carpeting from sagging away from the interior trim.

Figure 1:
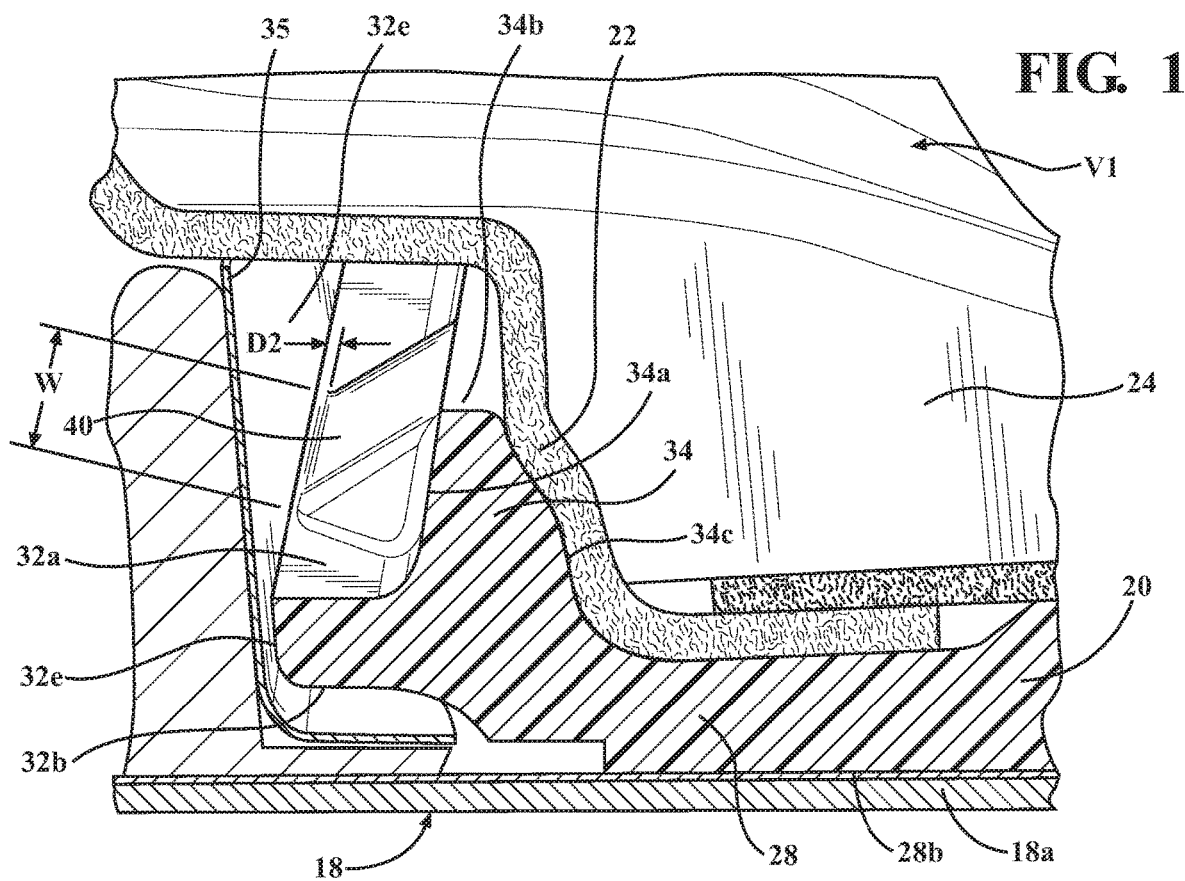
FIG. 1 is a schematic perspective view of a portion of a vehicle floor silencer in accordance with an embodiment described herein, shown installed in a vehicle occupant compartment with carpeting mounted on the floor silencer and a B-pillar trim element residing along a portion of the carpet.

FIGS. 1-4 show various views of an embodiment of a vehicle floor silencer 20 installed in a vehicle occupant compartment V1. FIG. 1 is a schematic perspective view of a portion of a vehicle floor silencer 20 in accordance with an embodiment described herein. The floor silencer is shown with carpeting 22 mounted on the floor silencer and a B-pillar trim element 24 mounted along a portion of the carpet. The floor silencer 20 may be secured to a floor 18a of the vehicle 18 between the carpeting 22 and the vehicle body. The floor silencer 20 may help attenuate NVH (noise, vibration, and harshness) problems during vehicle use.

Figure 2:
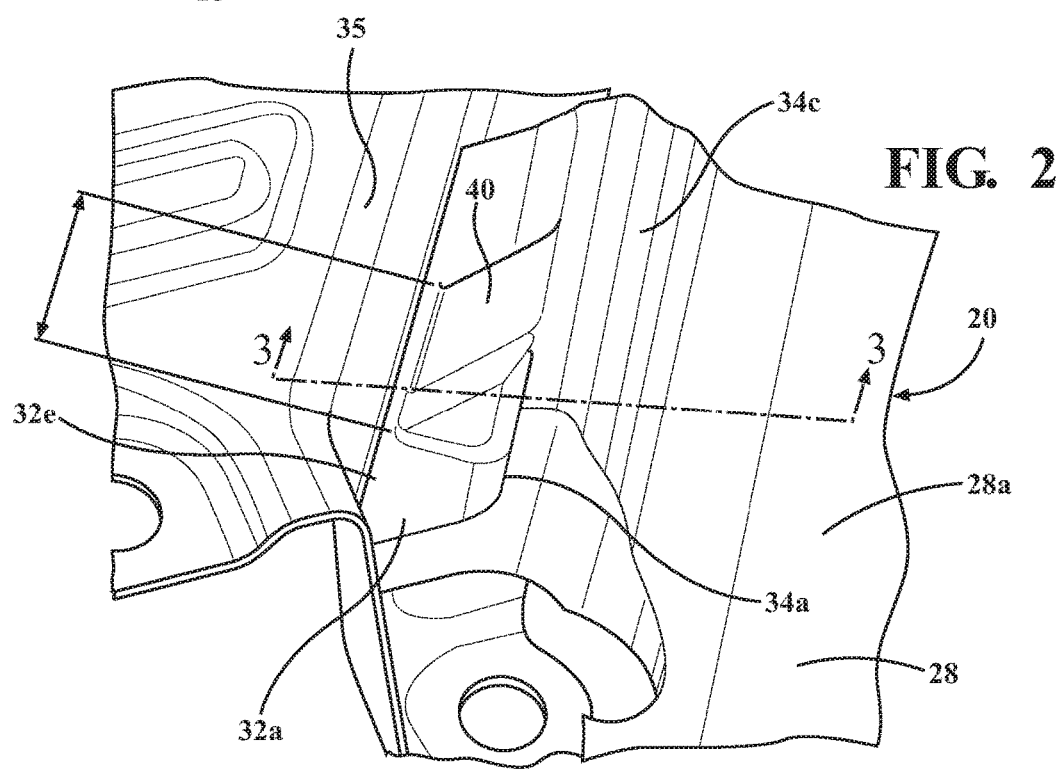
FIG. 2 is a magnified view of a portion of the floor silencer and vehicle of FIG. 1, shown with the carpeting and B-pillar trim removed.
Figure 3:
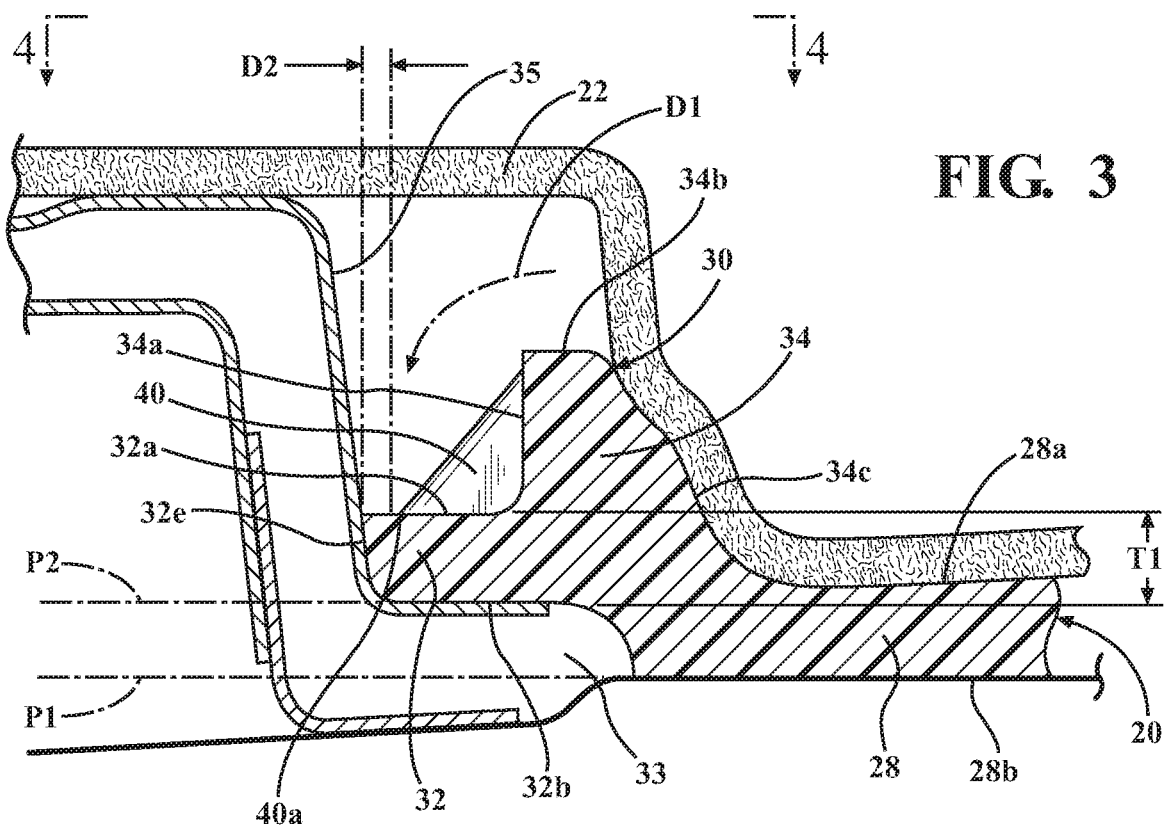
FIG. 3 is a schematic side cross-sectional view of the portion of the floor silencer and vehicle shown in FIG. 2.

FIG. 2 is a magnified view of a portion of the floor silencer and vehicle of FIG. 1, shown with the carpeting and B-pillar trim removed. FIG. 3 is a schematic side cross-sectional view of the portion of the floor silencer and vehicle shown in FIG. 2. Referring to FIGS. 1-3, in embodiments described herein, the floor silencer 20 may include a base portion 28. The base portion 28 may have an upper surface 28a structured to face in a generally vertically upward direction when the floor silencer 20 is mounted in a vehicle in its end-use application. The base portion upper surface 28a may be structured to support a layer of interior vehicle carpeting 22. The carpeting 22 may cover a portion of the floor 18a of the front of the vehicle occupant compartment, for example. The base portion 28 may also have a lower surface 28b extending opposite the upper surface 28a. The lower surface 28b may be structured to rest on a portion of the vehicle interior floor 18a. The base portion lower surface 28b may define a plane P1. In particular arrangements, the plane P1 may be a flat plane.

In one or more arrangements, a flange 30 may be formed along an edge of the base portion 28. The flange 30 may include a step 32 and a wall 34 extending from the step. The step 32 may have an upper surface 32a and a lower surface 32b extending opposite the step upper surface 32a. In one or more arrangements, the step lower surface 32b and the base portion 28 may combine to define a cavity 33 therebetween. The cavity 33 may be structured to receive portion(s) of one or more vehicle body panels 35 therein when the step 32 is positioned so as to rest on the body panel(s) 35. In particular arrangements, the step lower surface 32b may define a plane P2 extending parallel or substantially parallel to the plane P1 and spaced apart from the plane P1. The step may have an edge or end 32e. In one or more arrangements, step 32 may have a uniform thickness T1 along a length of the flange 30. As used herein, the term "substantially" includes exactly the term it modifies and slight variations therefrom. Thus, the term "substantially parallel" means exactly parallel and slight variations therefrom. In this particular example, slight variations therefrom can include within normal manufacturing tolerances for the dimensions and materials used in fabricating the floor silencer 20 using one of the material(s) and process(es) described herein.

Referring to FIG. 3, the wall 34 may have an outer surface 34a. The wall outer surface 34a may be a surface of the wall 34 positioned farthest from the base portion 28. In one or more arrangements, the wall outer surface 34a may be structured to extend generally vertically from the step upper surface 32a when the floor silencer 20 is mounted to the floor 18a of the vehicle 18 in its end-use application. The wall 34 may also have an uppermost edge 34b and an inner surface 34c extending from the uppermost edge 34b to the base portion upper surface 28a. The wall inner surface 34c may reside on an opposite side of the wall 34 from the wall outer surface 34a. In particular arrangements, the wall 34 may taper from a relatively smaller cross sectional area proximate the wall uppermost edge 34b to a relatively larger cross sectional area in a direction leading toward the base portion upper surface 28a. This taper may add stiffness to the wall 34, to aid in preventing the wall from deflecting in the direction D1.

Referring to FIGS. 1 and 3, along a portion of the floor silencer 20 located proximate the B-pillar trim 24, the flange wall 34 should force the carpeting 22 firmly against the B-pillar trim 24 as shown in FIG. 1. Various situations may cause the flange wall 34 to tend to deflect. For example, placement of a heavy weight on the carpeting near the wall or a vehicle occupant stepping on the carpet at or near the wall may cause an unsupported wall to deflect. Also, the B-pillar trim and/or other trim elements may be installed in the vehicle so as to create a crush condition in carpet fibers local to the pillar(s). Excessive pressure of the pillar elements on the carpeting may cause an unsupported wall to deflect. If the wall 34 deflects in direction D1 as shown in FIG. 3, the carpeting 22 may sag out of contact and out of alignment with the B-pillar trim 24, thereby impairing the fit and finish of the carpeting 22 with respect to the floor silencer 20 and the B-pillar trim 24. In addition, deflection of the wall 34 away from the carpeting 22 and B-pillar trim 24 may reduce the damping effectiveness of the floor silencer 20.

To help prevent deflection of the wall 34 in direction D1, at least one solid wall support element 40 may extend from the wall 34 to the step 32. The wall support element 40 may be structured to prevent at least an associated portion of the wall 34 (i.e., a portion of the wall adjacent the wall support element 40) from deflecting in the direction D1 toward the end 32e of the step 32. As shown in FIG. 3, the wall support element 40 may have a generally triangular structure extending between the wall outer surface 34a and the step upper surface 32a. An end 40a of the wall support element 40 may be spaced apart at least a minimum predetermined distance D2 from the end 32e of the step. This spacing and the clearances on opposed sides of the wall support element 40 may provide space needed to facilitate mounting of the floor silencer 20 to the body panel 35.

Figure 4:
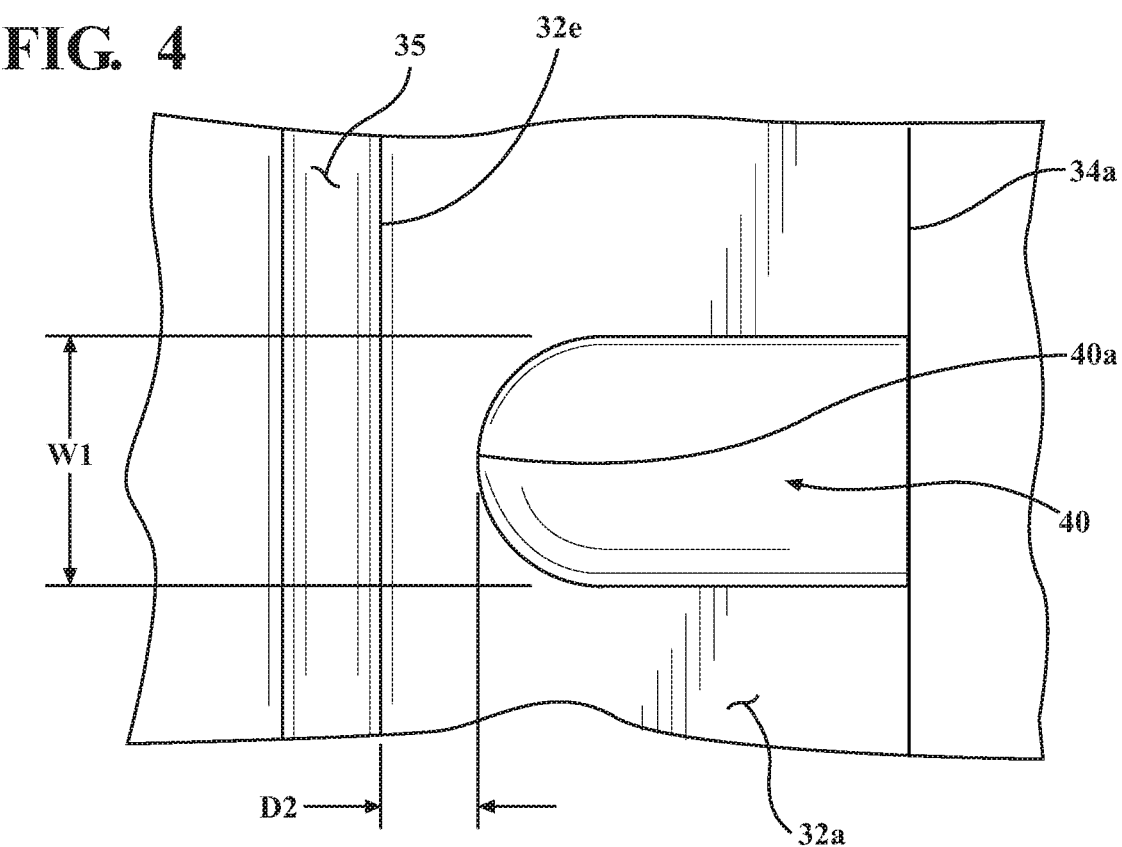
FIG. 4 is a schematic plan view of the portion of the floor silencer and vehicle shown in FIG. 3.

Referring to FIG. 4, in one or more arrangements, the wall support element 40 may have a uniform thickness W1. In particular embodiments, the wall support element may have has a thickness W1 substantially equal to the thickness T1 of the step 32. These features may aid in molding of the wall support element 40 into the floor silencer 20. In one or more arrangements, a plurality of wall support elements 40 as described herein may extend from the wall 34 to the step 32, with each wall support element 40 being structured to prevent an associated portion of the wall 34 from deflecting in the direction D1 toward the end 32e of the step 32. Multiple wall support elements 40 may provide additional reinforcement against wall deflection along portions of the floor silencer 20 located adjacent the B-pillar trim 24 or at other locations where deflection of the wall 34 may adversely affect fit and finish of the carpeting 22 with respect to other elements of the vehicle interior. Multiple wall support elements 40 may be spaced relatively closely together along a portion of the floor silencer depending on the forces applied to the floor silencer at the location, molding considerations, and other factors.

In one or more arrangements, an embodiment of the floor silencer may be molded from a moldable material having tensile strength in the range 29-39 kPa and having a molded density in the range of 0.03-0.06 g/cm3. In one or more arrangements, the material may be a moldable, resin-treated felt material formed from synthetic fiber & urethane. Use of wall support element(s) as described herein enables the use of a relatively more flexible material with a relatively lower range of tensile strength for the floor silencer, because a part structured as described herein relies less on an inherent stiffness of the material to prevent deformation or bending at the edges of the silencer. By eliminating carpet sagging, the wall support element(s) of the present invention provides an improvement to the appearance, fit and finish of the carpeting, especially along portions of the floor where the carpeting intersects the interior trim panels (e.g., the lower portion of the B-pillar trim panel). In addition, the use of a wall support element as described herein may enable the use of any of a wider variety of materials for molding the floor silencer, because the wall support element may provide added stiffness and help prevent unwanted deflection of the floor silencer along its edges. Thus, cost savings may be realized through the use of materials which were previously unsuitable for use in the floor silencer.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle floor silencer comprising:
   a base portion; and
   a flange formed along an edge of the base portion, the flange including a step, a wall extending from the step, and at least one wall support element extending between the wall and an upwardly-facing upper surface of the step and structured to prevent at least an associated portion of the wall from deflecting in a direction toward an end of the step.

2. The vehicle floor silencer of claim 1 wherein the wall has an outer surface facing in a direction toward an end of the step, and wherein the at least one wall support element extends between the wall outer surface and the step upper surface.

3. The vehicle floor silencer of claim 2 wherein the step has a lower surface extending opposite the step upper surface, and wherein the step lower surface and the base portion combine to define a cavity therebetween.

4. The vehicle floor silencer of claim 2 wherein the base portion has a lower surface defining a plane, and the step has a lower surface extending opposite the step upper surface and defining another plane extending parallel or substantially parallel the plane and spaced apart from the plane.

5. The vehicle floor silencer of claim 2 wherein the wall outer surface is structured to extend generally vertically upwardly from the step upper surface when the floor silencer is mounted to a floor of a vehicle, and wherein the wall has an uppermost edge and an inner surface extending from the uppermost edge to an upper surface of the base portion.

6. The vehicle floor silencer of claim 5 wherein the wall tapers from a relatively smaller cross sectional area proximate the wall uppermost edge to a relatively larger cross sectional area at the step upper surface.

7. The vehicle floor silencer of claim 1 wherein the at least one wall support element is spaced apart from the end of the step.

8. The vehicle floor silencer of claim 1 comprising a plurality of wall support elements extending from the wall to the step, each wall support element being structured to prevent an associated portion of the wall from deflecting in a direction toward the end of the step.

9. The vehicle floor silencer of claim 1 wherein the at least one wall support element has a uniform thickness.

10. The vehicle floor silencer of claim 9 wherein the at least one wall support element has a thickness substantially equal to a thickness of the step.

11. The vehicle floor silencer of claim 1 wherein the floor silencer is formed from a moldable felt material having tensile strength in the range 29-39 kPa.

12. The vehicle floor silencer of claim 2, wherein the wall outer surface resides at a first horizontal distance from the base portion and an end of the step resides at a second horizontal distance from the base portion greater than the first horizontal distance.

\* \* \* \* \*